United States Patent [19]

Szadkowski

[11] Patent Number: 5,307,913
[45] Date of Patent: May 3, 1994

[54] EXTERNAL DAMPER CLUTCH

[75] Inventor: Andrzej Szadkowski, Fort Wayne, Ind.

[73] Assignee: Dana Corporation, Toledo, Ohio

[21] Appl. No.: 5,412

[22] Filed: Jan. 19, 1993

Related U.S. Application Data

[63] Continuation of Ser. No. 813,703, Dec. 27, 1991, abandoned.

[51] Int. Cl.$^5$ ............................ F16D 3/12; F16D 3/62
[52] U.S. Cl. .............................. 192/70.17; 192/106.1; 74/574; 464/69; 464/84
[58] Field of Search ............... 192/106.1, 70.17, 30 V; 74/574; 464/69, 84, 100, 101

[56] References Cited

U.S. PATENT DOCUMENTS

| | | | |
|---|---|---|---|
| 1,541,411 | 6/1925 | Davis | 74/574 X |
| 4,723,463 | 2/1988 | Reik et al. | 74/574 |
| 4,727,970 | 3/1988 | Reik et al. | 192/70.17 |
| 4,732,250 | 3/1988 | Maucher et al. | 192/70.17 |
| 4,781,653 | 11/1988 | Nakamura et al. | 464/58 |
| 4,782,936 | 11/1988 | Bopp | 192/106.2 |
| 4,795,012 | 1/1989 | Durum | 192/55 |
| 4,961,487 | 10/1990 | Langeneckert | 192/106.2 |

FOREIGN PATENT DOCUMENTS

| | | | |
|---|---|---|---|
| 294130 | 12/1988 | European Pat. Off. | 192/106.1 |
| 1425224 | 12/1968 | Fed. Rep. of Germany | 464/69 |
| 2188126 | 9/1987 | United Kingdom . | |

Primary Examiner—Richard M. Lorence
Attorney, Agent, or Firm—Millen, White, Zelano & Branigan

[57] ABSTRACT

A flywheel clutch assembly disposed between an engine and transmission includes an external damper positioned between a flywheel and a clutch housing. The external damper allows relative motion between the flywheel and the clutch housing, while elastically resisting relative motion in both the driving and coast modes. The clutch housing is relatively heavy and functions as an additional flywheel as it is being rotated by the main flywheel of the assembly. The clutch mechanism disposed within the housing includes a rigid driven disk which assures minimum inertia in the drive line. In one specific aspect of the invention, the damper is comprised of a plurality of arcuate, nested beam springs pivoted at one end to the flywheel and at the other end to the heavy cover enclosing the clutch assembly. The resulting flywheel clutch assembly with the external damper disposed between the flywheel and clutch provides improved shiftability while minimizing rattle in both the idle and drive modes of the drive line.

10 Claims, 3 Drawing Sheets

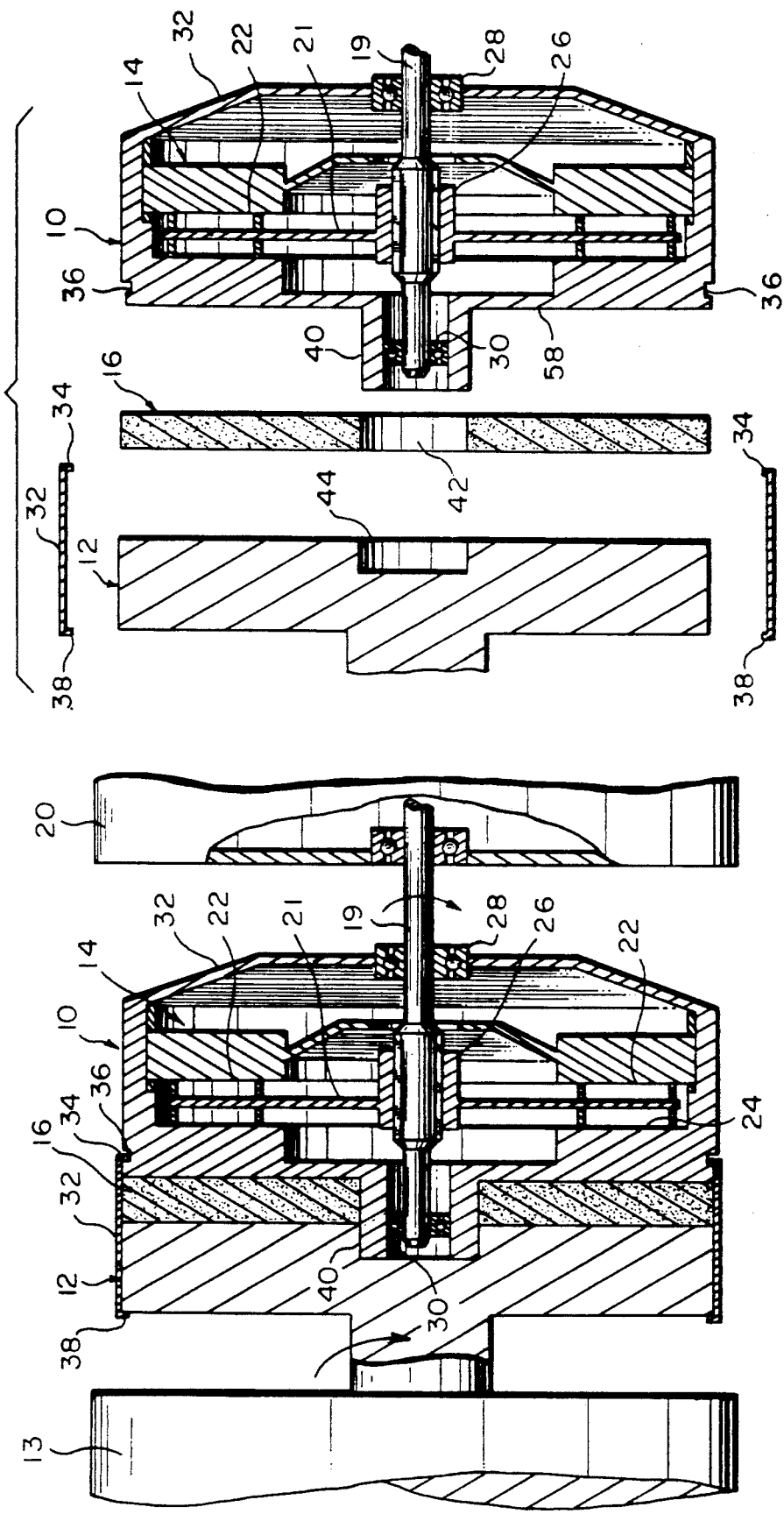

EXTERNAL DAMPER CLUTCH

This application is a continuation of application Ser. No. 07/813,703, filed Dec. 27, 1991, now abandoned.

FIELD OF THE INVENTION

The instant invention relates to damper clutches. More particularly, the instant invention relates to a clutch in which a damper is associated with a flywheel and clutch.

BACKGROUND OF THE INVENTION

In vehicles which utilize a clutch to couple an engine-driven flywheel to the input shaft of a transmission, there is a continuous need to enhance shiftability and to minimize rattle during both idle and drive operations. This can be accomplished by minimizing excessive proportional vibrations in the drive line while in the operating range and by increasing the travel and torque capacity of the clutch.

In order to maintain smooth shiftability conditions, it is desirable to maintain inertia in the system during gear shifts. In order to accommodate a variety of operational parameters, it is desirable to have a damper design with increased flexibility. Current damper designs are generally not configured for a wide range of operating conditions because design envelopes are restricted, as is flexibility in the number of stages and in the types of damping springs utilized. In order to eliminate both idle gear rattle and drive rattle, it is desirable to provide very soft and partially negative spring characteristics with long spring travel at idle as well as large hysteresis characteristics in the nominal driving range. Drive lines have resonances in their operating ranges which should be minimized, if at all possible. These resonances tend to become more pronounced with time and tend to degrade the vehicle in which the drive line is used.

SUMMARY OF THE INVENTION

The instant invention contemplates a flywheel clutch assembly comprising a flywheel and a clutch disposed within a clutch housing, wherein a damper is disposed between the flywheel and clutch housing, external to both. The damper allows relative motion between the clutch housing and the flywheel within the elastic limits of the damper.

In accordance with a preferred embodiment of the invention, the clutch mechanism within the housing includes a rigid driven disk which assures minimum inertia for improved shiftability, while the clutch cover functions as an additional flywheel. The clutch cover, in combination with long spring travel and relatively soft spring action, minimizes rattle during both idle and drive modes of the flywheel and clutch assembly.

In a specific aspect of the instant invention, the damper comprises a plurality of arcuate beam springs with each beam spring having one end attached to the flywheel and the other end attached to the clutch cover. The elasticity of the beam springs allows relative angular motion between the flywheel and clutch cover while tending to bias the flywheel and clutch housing to an unstressed state for the beam springs.

The instant invention further contemplates the combination of the aforedescribed assembly of a flywheel and clutch housing with a damper disposed therebetween with an engine and transmission useful in driving a vehicle.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 1 is a side view, partially in section, illustrating an external damper clutch configured in accordance with the principles of the instant invention;

FIG. 2 is an exploded side view of the damper clutch of FIG. 1;

DETAILED DESCRIPTION

Figure 4:
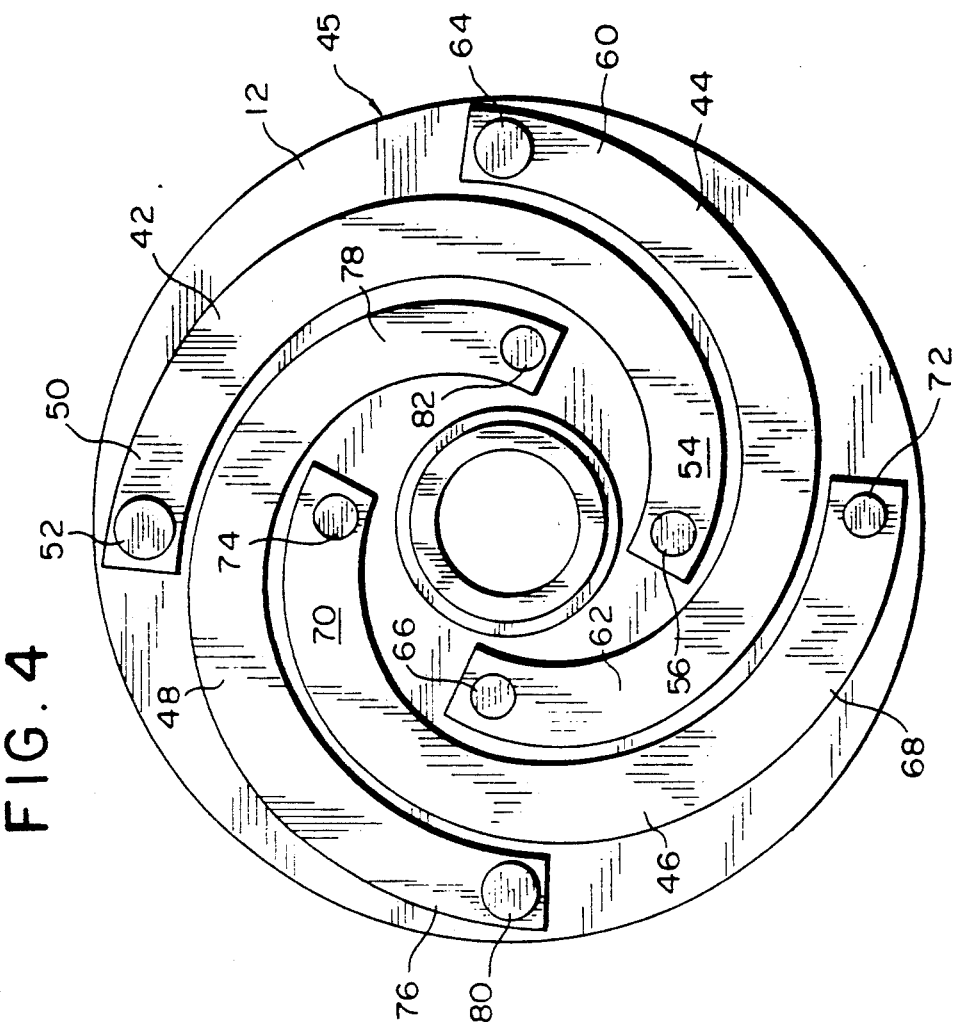
FIG. 4 is a front planar view of the damping component of FIG. 3.

Referring now to FIGS. 1 and 2, there is shown an external damper clutch 10 configured in accordance with the principles of the instant invention wherein a flywheel 12 which is driven by an engine 13 is coupled to a clutch assembly 14 through a damping component 16 disposed between the clutch assembly and flywheel. The clutch assembly 14 couples the flywheel 12 to a shaft 19 which is connected to a transmission 20 of, for example, a vehicle. Within the clutch assembly 14 there is a disk 21 which is fixed to the output shaft 19 and normally biased into engagement with a friction surface 24 by clutch springs (not shown) in a conventional manner. The clutch disk 21 is a rigid disk which is rigidly splined by a coupling 26 to the shaft 19. The shaft 19 is the input shaft of the transmission 20. Bearings 28 and 30 coaxially mount a heavy clutch cover 32 on the shaft 19 so that when the shaft is uncoupled from the clutch assembly 14, the shaft can rotate relative to the clutch cover. Normally, when the clutch 14 is engaged by pressing the rigid clutch disk 20 against the face 24 with the clutch plate 22, the output shaft 19 rotates with the flywheel 12. When the clutch 14 is disengaged, the output shaft 19 is no longer coupled to the flywheel 12 and the heavy cover 32 so that the flywheel and the output shaft 19 can rotate with respect to one another.

In accordance with the principles of the invention, the damping element 16 is positioned between the flywheel 12 and clutch cover 32 by a positioning device 32 which, in the illustrated in embodiment, has one lip 34 that is received in a groove 36 in the housing 32 and another lip 38 which fits behind the flywheel 12 to hold the assembly together while allowing relative motion between the flywheel and housing. The cover 32 has a supporting hub 40 which passes through an annular opening 42 in the damping element 16 and is journalled in a bearing 44 in the flywheel 12 so that the clutch housing 32 is rotatable with respect to the flywheel. The damper 16 provides an elastic connection between the flywheel 12 and the cover 32, allowing relative motion of the flywheel and cover within the limits of the elastic deflection provided by the damper 16. In its broadest interpretation, the damper 16 may assume any form wherein relative motion between the flywheel 12 and cover 32 elastically loads the damper when the cover and flywheel are displaced from an unstressed state of the damper.

Figure 3:
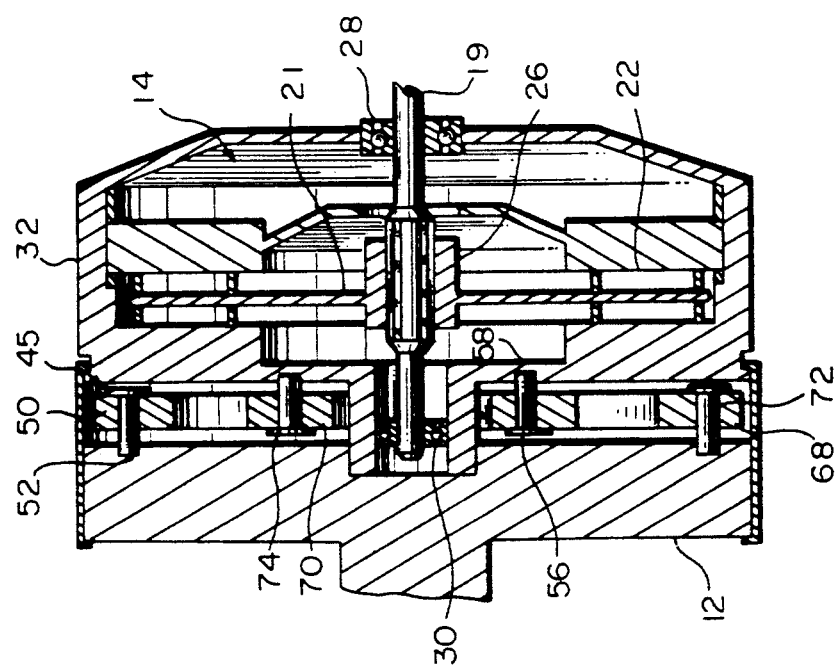
FIG. 3 is a side view of the damper clutch of FIGS. 1 and 2 utilizing a damping component having an array of beam springs.

Referring now to FIGS. 3 and 4 where a specific damper embodiment 45 of the damper 16 is disclosed, it is seen that the damper is comprised of a plurality of beam springs 42, 44, 46 and 48. The beam spring 42 has a first end 50 which is pivoted by a pin 52 to the flywheel 12 and has a second end 54 which is pivoted on a pin 56 to the back wall 58 of the housing 32. Likewise, the beam 44 has first and second ends 60 and 62, respectively, which are pivoted on pins 64 and 66 to the flywheel 12 and the back wall 58 of the housing 32, respectively; the beam spring 46 has first and second ends 68 and 70, which are pivoted by pins 72 and 74 to the flywheel and back wall of the housing, respectively, and beam 48 has first and second ends 76 and 78 which are pivoted on pins 80 and 82 to the flywheel and back wall of the clutch housing, respectively. The pins 52, 64, 72 and 80 are on the driving side of the damper 45 while pins 56, 66, 74 and 82 are on the driven side of the damper 45.

While the damper embodiment 45 of FIGS. 3 and 4 utilizes four beam springs 42-48, a larger or lesser number of beam springs may be utilized. For example, three beam springs may be utilized as is the case in the commonly assigned aforementioned U.S. patent application Ser. No. 07/813,702 titled "Damped Driven Disk Assembly", filed concurrently herewith in the name of Andrzej Szadkowski and incorporated herein by reference. As with the disk assembly disclosed in the co-pending application "Damped Driven Disk Assembly", the second end pins 56, 66, 74 and 82, upon which the second ends of the beams 42, 44, 46 and 48 are pivoted to the rear wall 58 of the housing 32, are displaced more than 180° from the first pins 52, 64, 72 and 80, which pivot first ends of the beam springs to the flywheel 12. This provides a partially negative spring characteristic which minimizes idle gear rattle in the transmission 20 attached to the output shaft as well as drive rattle. The beam springs 42-48 may have an elasticity which is very soft and, due to their spiral configuration, provide long travel as well as a large hysteresis effect in the nominal range.

By mounting the external damper 16 between the flywheel wheel 12 and clutch 14, the external damper allows relative rotation between the flywheel 12 and the clutch assembly 14 within a range limited by damper deflections. As is set forth in applicant's copending application entitled "Damped Driven Disk Assembly", this relative rotation can be relatively large. In applicant's copending application, the range of angular deflection is specifically set forth as approximately 41°. If necessary or desired, this range of deflection may be increased or decreased for the external damper clutch arrangement 10 of the instant invention.

The instant invention includes a range of angular displacement of the clutch housing 32 with respect to the flywheel 12 of about +30° to about −30° with respect to a reference determined by the undeflected status of the beam springs 42, 44, 46 and 48. The second ends 54, 62, 70 and 78 of the beam springs 42, 44, 46 and 48 angularly deflect with respect to the first ends 50, 60, 64 and 68 over a range of about 150° to about 210° about a 180° reference determined by the undeflected states of the beam springs.

Figure 5:
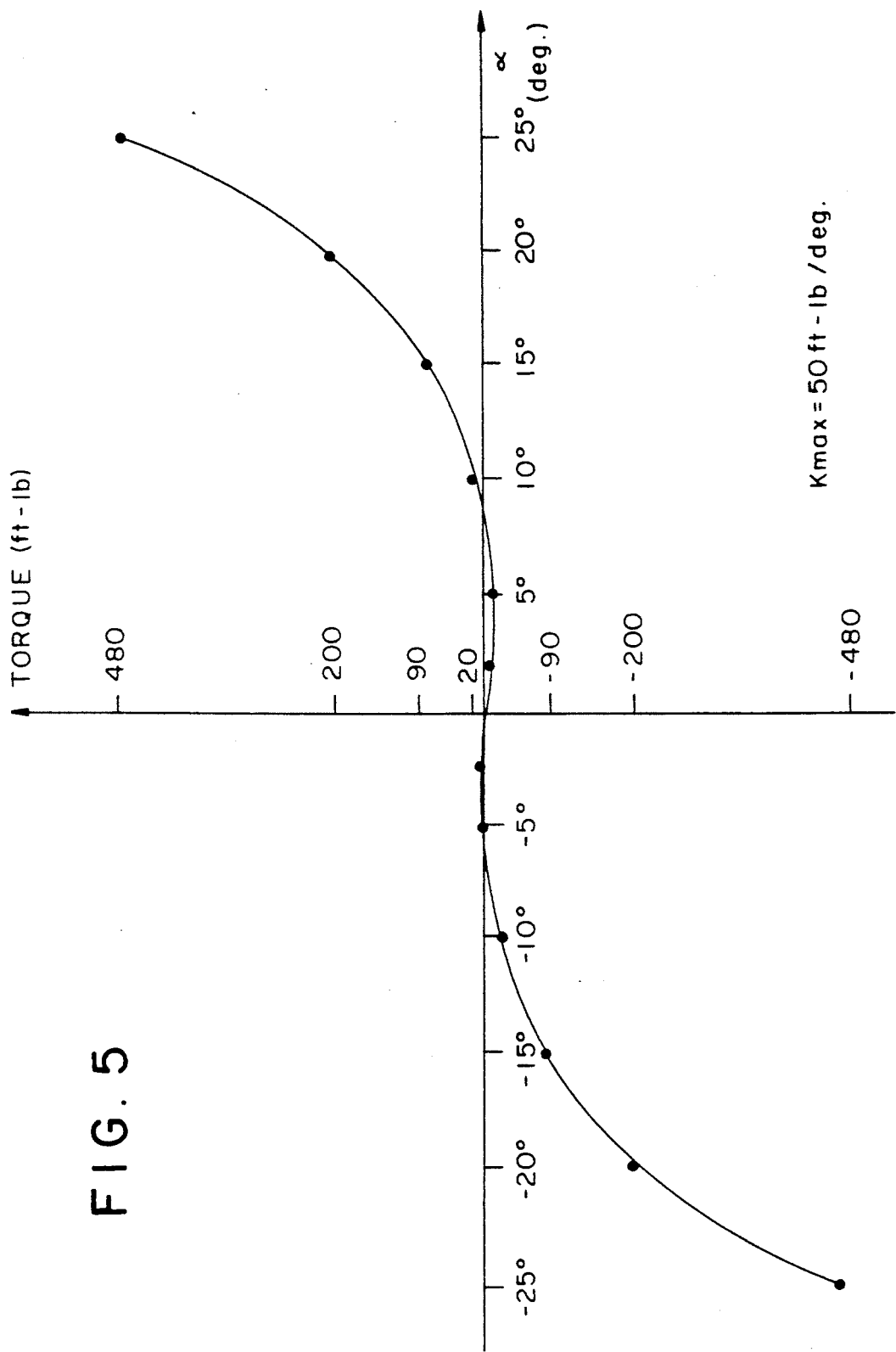
FIG. 5 is a graph plotting torque as a function of angular displacement for one of the beam springs of FIGS. 3 and 4.

In order to provide a partially negative spring characteristic, exemplified by the graph of FIG. 5, the second ends of 54, 62, 66 and 70 of the beam springs 42, 44, 46 and 48 may be more than 180° from the first ends 50, 60, 68 and 76 of the beam springs.

The heavy clutch cover 32 acts as a flywheel in addition to the flywheel 12 while the inertia of the rigid drive disk 21 is minimized. Moreover, the load on the pressure plate 22 provides the necessary hysteresis control. These characteristics of the external damper clutch 10 improves shiftability in the transmission 20 driven through output shaft 19 while providing an anti-rattle environment when the vehicle is in both the idle and drive mode.

The entire disclosures of all applications, patents and publications cited herein are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A clutch-and-flywheel assembly rotatable about an axis comprising:
   a flywheel;
   a clutch including a clutch housing within which is disposed a driven disk, a pressure plate and a friction face, the driven disk being disposed between the friction face and the pressure plate;
   a shaft on which the clutch housing is journalled, the shaft being fixed to the driven disk for rotation therewith while the pressure plate urges the disk into engagement with the friction face; and
   a damper disposed between the flywheel and clutch assembly, the damper being comprised of a plurality of beam springs having first and second ends wherein the first ends are connected to the flywheel and the second ends are connected to the clutch housing, the first and second ends of each beam spring being angularly spaced less than one full 360° turn from one another when undeflected by an angle greater than 180°, wherein each beam spring extends circumferentially more than 180° and less than 360°, which angle is sufficient to provide a partially negative spring characteristic, whereby the beam springs deflect elastically from an unstressed state to provide for relative rotational motion between the flywheel and clutch housing.

2. The flywheel and clutch assembly of claim 1, wherein the housing and flywheel are coaxially positioned with respect to one another.

3. The flywheel and clutch assembly of claim 2, wherein the clutch housing includes an axially projecting spindle coaxial with the flywheel to rotatably mount the clutch housing with respect to the flywheel.

4. The assembly of claim 1, wherein the beam springs are pivotally connected at the first and second ends thereof to the flywheel and clutch housing, respectively, by pins.

5. The flywheel and clutch assembly of claim 1, wherein beam springs are at least three in number.

6. The flywheel and clutch assembly of claim 1, wherein the beam springs all lie in a common plane perpendicular to the rotational axis of the assembly.

7. In combination with an engine and a transmission, a clutch-and-flywheel assembly rotatable about an axis, the clutch-and-flywheel assembly comprising:
- a flywheel;
- a clutch including a clutch housing within which is disposed a driven disk, a pressure plate and a friction face, the driven disk being disposed between the friction face and the pressure plate;
- an output shaft on which the clutch housing is journalled, the output shaft being fixed to the driven disk for rotation therewith while the pressure plate urges the disk into engagement with the friction face; and
- a damper having a bias during the flywheel and clutch housing to assume a relative angular position in which the damper is unstressed, the damper being disposed between the flywheel and clutch assembly, the damper being comprised of a plurality of beam springs having first and second ends wherein the first ends are connected to the flywheel and the second ends are connected to the clutch housing, the first and second ends of each beam spring being angularly spaced less than one full 360° turn from one another when undeflected by an angle greater than 180°, wherein each beam spring circumferentially extends more than 180° and less than 360°, which angle is sufficient to provide a partially negative spring characteristic, whereby the beam springs deflect elastically from an unstressed state to provide for relative rotational motion between the flywheel and clutch housing.

8. The combination of claim 7, wherein the beam springs are pivotally connected at the first and second ends thereof to the flywheel and clutch housing, respectively, by pins.

9. The combination of claim 7, wherein the beam springs are at least three in number.

10. The combination of claim 9, wherein the beam springs all lie in a common plane perpendicular to the rotational axis of the assembly.

* * * * *